(12) United States Patent
Gotting et al.

(10) Patent No.: US 8,238,650 B2
(45) Date of Patent: Aug. 7, 2012

(54) ADAPTIVE SCENE DEPENDENT FILTERS IN ONLINE LEARNING ENVIRONMENTS

(75) Inventors: Michael Gotting, Spenge (DE); Heiko Wersing, Frankfurt am Main (DE); Jochen J. Steil, Bielefeld (DE)

(73) Assignee: Honda Research Institute GmbH, Offenbach/Main (DE)

( * ) Notice: Subject to any disclaimer, the term of this patent is extended or adjusted under 35 U.S.C. 154(b) by 1022 days.

(21) Appl. No.: 11/610,261

(22) Filed: Dec. 13, 2006

(65) Prior Publication Data

US 2007/0147678 A1   Jun. 28, 2007

(30) Foreign Application Priority Data

Dec. 22, 2005   (EP) .................................... 05028259

(51) Int. Cl.
*G06K 9/00* (2006.01)
(52) U.S. Cl. ......................... 382/155; 382/159; 382/173
(58) Field of Classification Search .................. 382/118, 382/155, 159, 160, 171, 173, 181, 190
See application file for complete search history.

(56) References Cited

U.S. PATENT DOCUMENTS

| 6,807,286 | B1 * | 10/2004 | Krumm et al. ................ 382/103 |
| 6,826,316 | B2 * | 11/2004 | Luo et al. ..................... 382/305 |
| 2005/0047647 | A1 | 3/2005 | Rutishauser et al. | |
| 2005/0129275 | A1 * | 6/2005 | Porter et al. .................. 382/103 |
| 2006/0239552 | A1 * | 10/2006 | Tu et al. ........................ 382/173 |
| 2007/0025637 | A1 * | 2/2007 | Setlur et al. .................. 382/276 |

FOREIGN PATENT DOCUMENTS

EP    1 542 153 A    6/2005

OTHER PUBLICATIONS

Steil et al. (Jan. 2007) "Adaptive scene dependent filters for segmentation and online learning of visual objects." Neurocomputing, vol. 70 pp. 1235-1246.*
Walther et al. (Jun. 2005) "Selective visual attention enables learning and recognition of multiple objects in cluttered scenes." Computer Vision and Image Understanding, vol. 100 pp. 41-63.*
Krumm, J. (Jun. 1997) "Object detection with vector quantized binary features." 1997 IEEECS Conf. on Computer Vision and Pattern Recognition, pp. 179-185.*
Gray, R.M. (Apr. 1984) "Vector quantization." IEEE ASSP Magazine, pp. 4-29.*
Borenstein et al. (Jun. 2004) "Combining top-down and bottom-up segmentation." 2004 IEEECS Conf. on Computer Vision and Pattern Recognition Workshop, pp. 46-53.*

(Continued)

*Primary Examiner* — Bhavesh Mehta
*Assistant Examiner* — Barry Drennan
(74) *Attorney, Agent, or Firm* — Fenwick & West LLP

(57) ABSTRACT

A method and a system for determining an object segment in an electronic image. Preferably the method or system is sufficiently fast to allow real-time processing. A method for determining an object segment in an electronic image may comprise the steps of unsupervised learning of a multi-feature segmentation and of forming a relevance map. The method may further comprise the step of estimating the probability of a segment belonging to an object by the overlap of the segment and the relevance map in the electronic image.

17 Claims, 5 Drawing Sheets

OTHER PUBLICATIONS

Heisele et al. (Jun. 1997) "Tracking non-rigid moving objects based on color cluster flow." 1997 IEEECS Conf. on Computer Vision and Pattern Recognition, pp. 257-260.*

Ward et al. (Feb. 2005) "Attributed vector quantization: a new paradigm for segmentation and pattern acquisition." SPIE vol. 5679, pp. 266-275.*

Wong et al. (Oct. 2002) "A robust scheme for live detection of human faces in color images." Signal Processing: Image Communication, vol. 18 No. 2, pp. 103-114.*

Hosseini et al. (Oct. 2001) "Automatic adjustment of learning rates of the self-organizing feature map." Scientia Iranica, vol. 8 No. 4, pp. 277-286.*

Muhlmann et al. (2002) "Calculating dense disparity maps from color stereo images, an efficient implementation." Int'l J. Computer Vision, vol. 47 No. 1-3, pp. 79-88.*

Goerick, Christian et al., "Peripersonal Space and Object Recognition for Humanoids," IEEE /RSJ International Conference on Humanoid Robots, Dec. 5, 2005, 6 pages, Tsukuba, Japan.

Boehme, Hans-Joachim, et al., "User Localisation for Visually-based Human-Machine—Interaction," Automatic Face and Gesture Recognition, Third IEEE International Conference on NARA, Japan, Apr. 14, 1998, pp. 486-491, Los Alamitos, CA.

Breazeal, Cynthia et al., "Active Vision for Sociable Robots," IEEE Transactions on Systems, Man and Cybernetics, Part A: Systems and Humans, Sep. 2001, pp. 443-453, vol. 31 No. 5, Piscataway, New Jersey, U.S.A.

Triesch Jochen, "The Rôle of a priori Biases in Unsupervised Learning of Visual Representations: A Robotic Experiment," Proc. Workshop Developmental Embodied Cognition Deco-2001, Jul. 31, 2001, 5 pages.

Boskovitz, Victor et al., "An Adaptive Neuro-Fuzzy System for Automatic Image Segmentation and Edge Detection," IEEE Transactions on Fuzzy Systems, Apr. 2002, pp. 247-262, vol. 10 No. 2, Piscataway, New Jersey, U.S.A.

Andrew, Lachlan L.H. et al., "A New Adaptive Image Sequence Coding Scheme Using Kohonen's SOFM," Neural Networks, 1995 Proceedings, IEEE International Conference on Perth, WA, Australia, Dec. 1995, pp. 2071-2074, vol. 4, New York, New York, U.S.A.

European Search Report, EP 05028259.9, Jul. 21, 2006, 9 pages.

* cited by examiner

400

ADAPTIVE SCENE DEPENDENT FILTERS IN ONLINE LEARNING ENVIRONMENTS

RELATED APPLICATIONS

This application claims benefit under 35 USC 119(a)-(d) to European patent application 05028259.9 filed on Dec. 22, 2005 which is incorporated by reference herein in its entirety.

FIELD OF THE INVENTION

The present invention relates to the field of digital image processing by a machine. In particular, it relates to the problems of attention control, scene segmentation and objection recognition by a machine in real-world scenes.

BACKGROUND OF THE INVENTION

To enable intelligent man-machine interaction, attention control and object recognition are widely recognized as important issues. Due to the difficulty of scene segmentation and object recognition in real-world scenes, most work in this area has concentrated on explicitly or implicitly constrained scenarios, e.g. uncluttered background, homogenous coloring of foreground objects, or predefined objects classes. It remains difficult, however, to bridge the gap between the low level perceptual cues and the symbolic levels of object representations.

Current approaches for object learning are based on probabilistic and Bayesian methods (Krishnapuram B., C. M. Bishop, and M. Szummer, *Generative models and Bayesian model comparison for shape recognition*, Proceedings Ninth International Workshop on Frontiers in Handwriting Recognition, 2004, which is incorporated by reference herein in its entirety. J. Winn and N. Joijic, *Locus: Learning object classes with unsupervised segmentation*, Intl. Conf. on Computer Vision, 2005 which is incorporated by reference herein in its entirety. These demonstrate learning prototypic object categories together with their varying shape from natural images, but their methods are computationally extremely demanding and are not suitable for online and interactive learning.

To facilitate visual processing and to reduce search spaces, cognitive vision systems can use attention based vision control to generate fixations. On the lower level, attention control can be based on topographically ordered maps to focus the system resources to certain points of interest. For example in Joseph A. Driscoll, Richard Alan Peters II, and Kyle R. Cave, *A visual attention network for a humanoid robot*, Proceedings of the IEEE/RSJ International Conference on Intelligent Robots and Systems (IROS-98), Victoria, B.C., Oct. 12-16 1998, which is incorporated by reference herein in its entirety. These maps primarily use simple stimuli like color, oriented edges, or intensity, although mechanisms to integrate higher level information have also been proposed, for example, in J. J. Steil, G. Heidemann, J. Jockusch, R. Rae, N. Jungclaus, and H. Ritter, *Guiding attention for grasping tasks by gestural instruction: The gravis-robot architecture*, Proc. IROS 2001, pages 1570-1577. IEEE, 2001, which is incorporated by reference herein in its entirety. One approach to reach the semantic level is to search for known objects at the current fixation point with a holistic object classification system (for example in J. J. Steil and H. Ritter, *Learning issues in a multi-modal robot-instruction scenario*, IEEE Int. Conf. Robotics, Intelligent Systems and Signal Processing, 2003, which is incorporated by reference herein in its entirety) and to store objects recognized in a symbolic memory (for example in G. Heidemann, *A multi-purpose visual classification system*, B. Reusch, Editor, Proc. 7th Fuzzy Days, Dortmund, 2001, pages 305-312, Springer-Verlag, 2001; and in G. Heidemann and H. Ritter, *Combining multiple neural nets for visual feature selection and classification*, Proceedings of ICANN 99, 1999, which are incorporated by reference herein in their entirety). Due to the need for a large amount of training images from different views, the object classification itself has to be trained offline beforehand.

It is generally believed that segmentation and recognition are closely connected and some authors try to solve both approaches concurrently (see, for example, Stella X. Yu, Ralph Gross, and Jianbo Shi, *Concurrent object recognition and segmentation by graph partitioning*, Online proceedings of the Neural Information Processing Systems conference, 2002, which is incorporated by reference herein in its entirety), which results in rather complex architectures without online capabilities. In more classical approaches, segmentation is treated as an independent preprocessing step towards recognition. However, in such learning contexts it is crucial to use unsupervised segmentation, because a priori knowledge about the object to segment is not available.

To enable unsupervised segmentation, several cluster based segmentation approaches use different color spaces and sometimes the pixel coordinates as feature space. Such approaches are found in: Guo Dong and Ming Xie, *Color clustering and learning for image segmentation based on neural networks*, IEEE Transactions on Neural Networks, 16(14):925-936, 2005; and Y. Jiang and Z.-H. Zhou, *Some ensemble-based image segmentation*, Neural Processing Letters, 20(3):171-178, 2004, which are incorporated by reference herein in their entirety. They apply a vector quantization method like k-means or self organizing maps (SOM) to partition this space and segment the image with respect to the codebook vectors. Similarly, some approaches index the colors, quantize this index space, and back project this quantization to segments. For example in Jung Kim Robert Li, *Image compression using fast transformed vector quantization*, Applied Imagery Pattern Recognition Workshop, page 141, 2000; and Dorin Comaniciu and Richard Grisel, *Image coding using transform vector quantization with training set synthesis*, Signal Process., 82(11): 1649-1663, 2002, which are incorporated by reference herein in their entirety. Though such quantization methods can potentially be fast, they assume that objects have to be homogeneously colored and can be covered by one segment. If stereo images are available, disparity information can be used as segmentation cue (see N. H. Kim and Jai Song Park, *Segmentation of object regions using depth information*, ICIP, pages 231-234, 2004 which is incorporated by reference herein in its entirety) and some approaches try to support unreliable disparity information by additional color segmentation (see, Hai Tao and Harpreet S. Sawhney, *Global matching criterion and color segmentation based stereo*, Workshop on the Application of Computer Vision, pages 246-253, 2000 which is incorporated by reference herein in its entirety). In these schemes color segmentation is not learned and uses strong underlying homogeneity assumptions. Implicitly it is also assumed in these approaches that the objects to segment are isolated from each other, which in real scenarios often not the case, in particular not if humans manipulate and present objects to be learned to the machine.

Some approaches have been made to combine unsupervised color clustering methods with top down information about the object derived from other sources (see E. Borenstein, E. Sharon, and S. Ullman, *Combining top-down and bottom-up segmentation,* 2004 Conference on Computer Vision and Pattern Recognition Workshop (CVPRW'04), 4:46, 2004; and M. J. Bravo and H. Farid, *Object segmentation by top-down processes*, Visual Cognition, 10(4):471-491, 2003 which are incorporated by reference herein in their entirety). This approach has the advantage that in the unsupervised step smaller segments can be generated which may over-segment the objects. Thus homogeneity assumptions can be relaxed, however, the top down information must be sufficient to resolve the resulting ambiguities.

In Borenstein (cited above) therefore, the unsupervised step consists of generating a hierarchy of segments ordered in a tree and a successive optimization procedure to label the segments as belonging to the object with respect to a cost function based on the top-level information.

The complexity of this method is linear in the number of pixels, but still not sufficiently fast to allow real-time performance processing with several frames per second.

SUMMARY OF THE INVENTION

The invention provides a fast method and a system for determining an object segment in an electronic image. Preferably the method or system is sufficiently fast to allow real-time processing e.g., with several frames per second.

A method for determining an object segment in an electronic image may comprise the steps of unsupervised learning of a multi-feature segmentation and of forming a relevance map.

The method may further comprise the step of estimating the probability of a segment belonging to an object by the overlap of the segment and the relevance map.

In the method, the step of unsupervised learning of a multi-feature segmentation may further comprise the steps of forming training data vectors using basic filter maps, obtaining codebook vectors from the training data vectors using a vector quantization network, generating adaptive topographic activation maps from the training data vectors and the codebook vectors and binarising the adaptive topographic activation maps to obtain binarised adaptive topographic activation maps.

In this method, the generation of the activation maps may employ a standard vector quantization network with a fixed number of training steps. The vector quantization method that is applied may also be a k-means method, a flavor of the self-organizing map or a growing network like growing neural gas or the instantaneous topological map.

Furthermore, the training data vectors $\vec{m}(x,y)$ may include the pixel positions (x,y) as features.

Each component of the training data vectors may be normalized by its variance $\sigma(m_i)^2$. Each component of the training data vectors may further be weighted by an additional weighting factor. The additional weighting factor may be heuristically determined.

The initial codebook vectors $\vec{c}^j$ are obtained by the steps of drawing a random (x,y)-position from an image, generating the feature vector at this position, computing the minimal distance of this vector to all codebook vectors in the current codebook and assigning a new codebook vector. The new codebook vector may be equal to randomly drawn vector if the minimal distance is larger than a threshold value and a new feature vector is drawn otherwise. For subsequent input images the already existing codebook vectors are adapted using standard VQ learning steps.

Moreover, the scene dependent adaptive topographic activation map ($V^j$) may be computed as $V^j(x,y)=\|\vec{m}(x,y)-\vec{c}^j\|^2$.

The scene dependent adaptive topographic activation maps ($V^j$) may be binarised by a winner-take-all competition over all j.

Furthermore, the relevance mask may be computed as an additive superposition from a center map and a disparity map.

The relevance map may be used to find out which combination of the adaptive scene dependent filters (ASDF) should be selected. The method may further comprise the step of forming a skin color mask/detecting skin color. An adaptive skin color segmentation may further exclude skin color regions from the final mask.

The number of pixels of the intersection between the relevance mask and the binarised topographic activation map and the number of pixels of the binarised topographic activation map without the relevance mask may be used for selecting the suitable masks. The probability of a mask belonging to the object is estimated by the overlap between the relevance mask and the topographic activation map. The mask may be included in the final segment mask, if the relative frequency is larger than a given threshold. The final mask may be computed as the additive superposition of the selected activation maps and the skin color pixels may be removed from this mask.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE FIGURES

Further aspects and advantages of the invention will become apparent when reading the following detailed description in connection with the annexed drawing, in which.

DETAILED DESCRIPTION OF THE INVENTION

Figure 1:
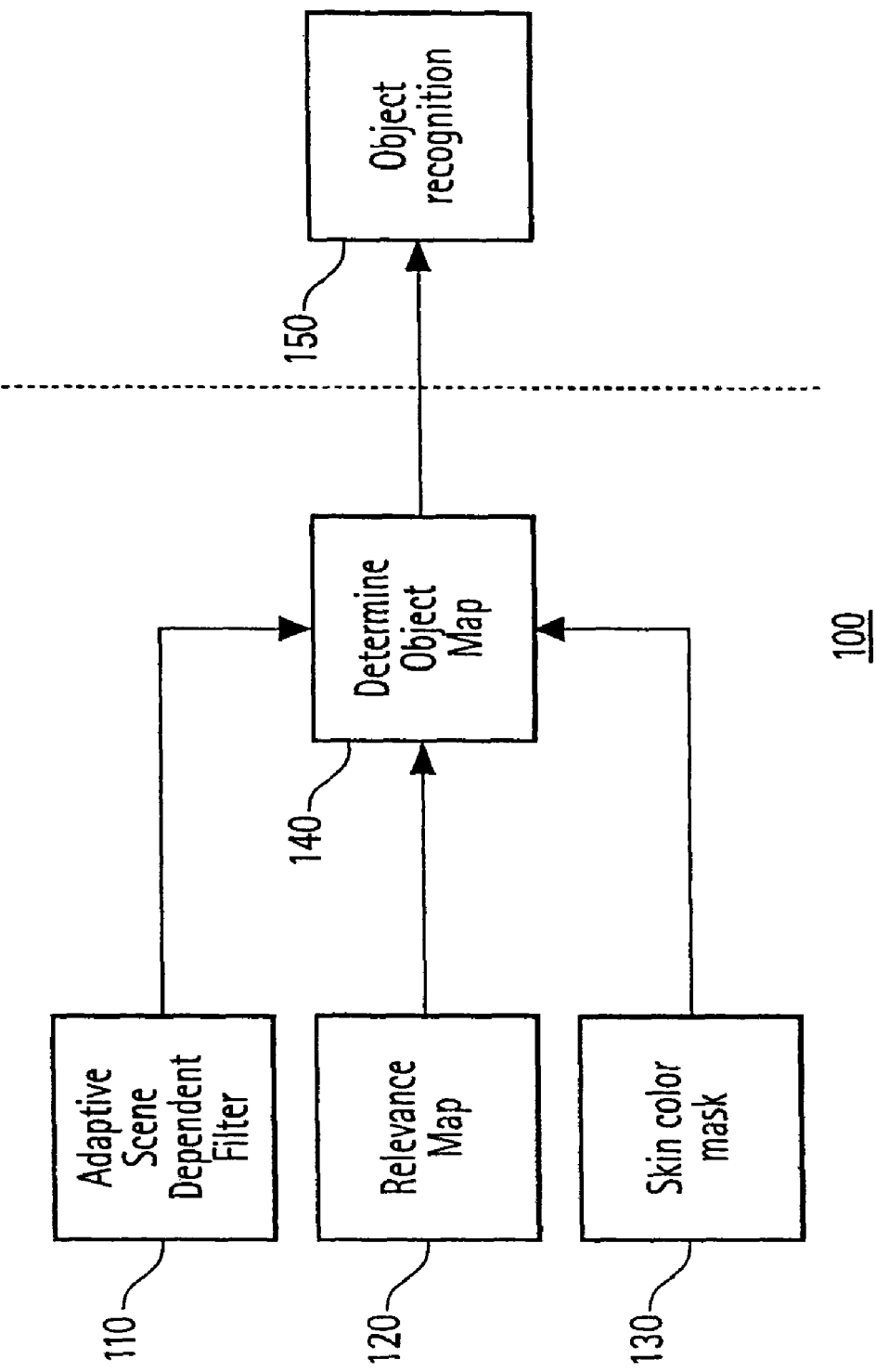
FIG. 1 is an illustration of a multi-path ASDF processing scheme for image segmentation and object recognition using adaptive filters, a relevance map, skin color detection and an object recognition module in accordance with one embodiment of the present invention.

A preferred embodiment of the present invention is now described with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

FIG. 1 shows an overview of a multi-stage and multi-path ASDF processing scheme for image segmentation and object recognition, using adaptive scene dependent filters (ASDF) 110, a relevance map 120 and skin color detection 130 as inputs for an object map determination module 140. The object map determination module 140 determines a segmentation mask, which is subsequently used in an object recognition module 150.

The dotted vertical line indicates, that the processing scheme is two-fold. First, a segmentation mask is derived. Second, the obtained segmentation mask is used by the object recognition module.

In one embodiment, the present invention obtains the above three inputs 110, 120 and 130 and combines them in order to derive such a segmentation mask.

Figure 2:
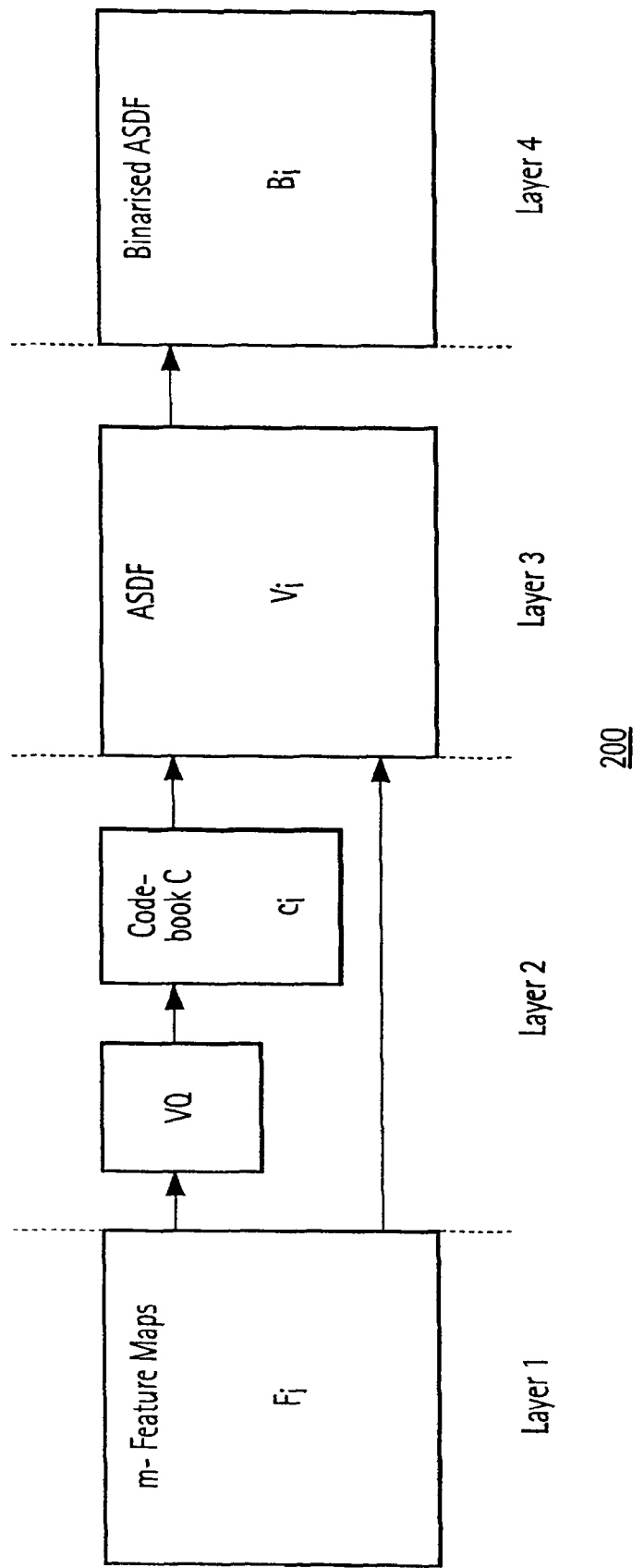
FIG. 2 is an illustration of a multistage ASDF architecture in accordance with one embodiment of the present invention.

With reference to FIG. 2, the process of obtaining the adaptive scene-dependent filters 110 will be explained first.

It is assumed that in earlier stages of a complete vision architecture, low level filter operations or basic filter maps on an input image are provided. As opposed to pure color segmentation schemes, combinations of all kinds of topographic feature maps like edge maps, intensity, difference images, velocity fields, disparity, image position, or different color spaces for forming a combined feature space are allowed. In the present invention, M such basic filter maps $F_i$ with features $m_{(x,y)}^i$, i=1 ... M at pixel positions (x, y) are used in layer 1:

$$\vec{m}_{(x,y)} = \left( \xi^1 \frac{m_{(x,y)}^1}{\sigma(m^1)^2}, \cdots , \xi^n \frac{m_{(x,y)}^M}{\sigma(m^n)^2}, \xi^x m_{(x,y)}^x, \xi^y m_{(x,y)}^y \right)^T \quad (1)$$

where (x, y) is the respective pixel index and $m_{(x,y)}^x = x$, $m_{(x,y)}^y = y$ include the pixel position as feature. Each component is normalized by its variance $\sigma(m_i)^2$. $\xi^i$ is an additional heuristically determined weighting factor, which can be used to weight the relative importance of different map.

In layer 2, a vector quantization network (VQ) is employed to obtain N prototypic codebook vectors $\vec{c}^j$, j=1 ... N representing the most frequent and salient feature combinations. The vector quantization method that is applied may be a k-means method, a flavor of the self-organizing map or a growing network like growing neural gas or the instantaneous topological map. In the following, the generation of the activation maps employs a standard VQ with a fixed number of training steps (to speed up computation) and training data $\vec{m}_{(x,y)}$ (cf. equation 1 above).

In each step, the minimal distance $$d_{min} = \min_j \|\vec{m}_{(x,y)} - \vec{c}^j\|^2, \vec{c}^j \epsilon C$$

is calculated and the winning codebook vector with minimal distance is adapted through the standard VQ rules.

The initialization of the VQ codebook C may start with an empty codebook and incrementally assign new codebook vectors by the following procedure:

Draw a random (x, y)-position from the image, generate the feature vector $\vec{m}_{(x,y)}$ at this position and compute the minimal distance $d_{min}$ of $\vec{m}_{(x,y)}$ to all $\vec{c}^j$ in the current codebook. A new codebook vector $\vec{c}^j$ is assigned dependent on $d_{min}$ $$\vec{c}^{j'} = \begin{cases} \vec{m}_{(x,y)} & \text{if } d_{min} > \bar{d} \\ \text{else} & \text{draw a new } \vec{m}_{(x,y)} \end{cases}$$

where $\bar{d}$ is a threshold value to ensure a good distribution of the codebook vectors. This procedure may be done before each adaptation step of the VQ until the maximum number of codebook vectors is reached.

The above-described steps may be embodied in the algorithm (written in pseudocode) in table 1.

TABLE 1

```
Set the number of iterations as Q
Set the number of local VQ standard learning steps as R
C:=Ø; /* Codebook initially empty
q=0;
while (q<Q) do
    { /* The first iteration
    if (C = Ø) then c' := m̄ (x,y);
    /* init the first center, where (x,y) is a
    /* random position in the image
    /* Apply standard VQ learning rule to the current
    /* set of VQ centres c' ∈ C;
    r=0;
    while (r<R) do
        {
        choose (x,y) randomly in image;
        determine c'_min ∈ C with minimal distance to m̄ (x,y);
        update c'_min := c'_min + η (m_(x,y) c'_min);
        r:=r+1;
        }
    /* add adaptively new VQ centres
    if (#C ≤ max)
        {
        (x,y) := random position in image;
        m̄ (x,y) := feature vector generated at this position ;
        d_min := min_j ∥ m̄ (x,y) − c̄' ∥², c̄' ∈ C ;
        if (d_min > d') /* d' is a threshold value
            then C:= C∪{m̄ (x,y) /* add m̄ (x,y) as a new c̄' to
                        /* current C
        }
    q:=q+1;
    }
```

The algorithm carries out Q iteration steps. Within each step, a standard VQ learning step is carried out for the existing codebook vectors. New codebook vectors are added, if a randomly drawn $\vec{m}_{(x,y)}$ has a large enough distance to the already existing codebook vectors.

In layer 3, the partition of the feature space then generates for each codebook vector a new adaptive feature map by assigning to each pixel position the distance of the original feature vector to the codebook vector.

The input for layer 3 consists of the adaptive codebook C and the basic filter maps $F_i$. Based on the codebook, N scene dependent activation maps $V^j$ are computed as $$V^j(x,y) = \|\vec{m}(x,y) - \vec{c}^j\|^2$$

A further winner-take-all competition among the adaptive maps is then used to obtain disjoint segments. This is achieved by binarising the maps $V^j$ as $$B^j_{(x,y)} = \begin{cases} 1 & \text{if } \|\vec{m}_{(x,y)} - \vec{c}^k\|^2 < \|\vec{m}_{(x,y)} - \vec{c}^j\|^2, \forall k \neq j \\ 0 & \text{else} \end{cases}$$

The challenge for the Determine Object Map-Unit 140 is then to find out the combination of the ASDF's to segment the focused object. This is done in a recombination step, using an appropriate selection criterion.

A relevance map may be used as an appropriate selection criterion. The relevance map may serve as a prediction mask for a rough region around the focused object. This region may be used as a cue to find the appropriate filters out of a set of adaptive scene dependent filters.

Figure 3:
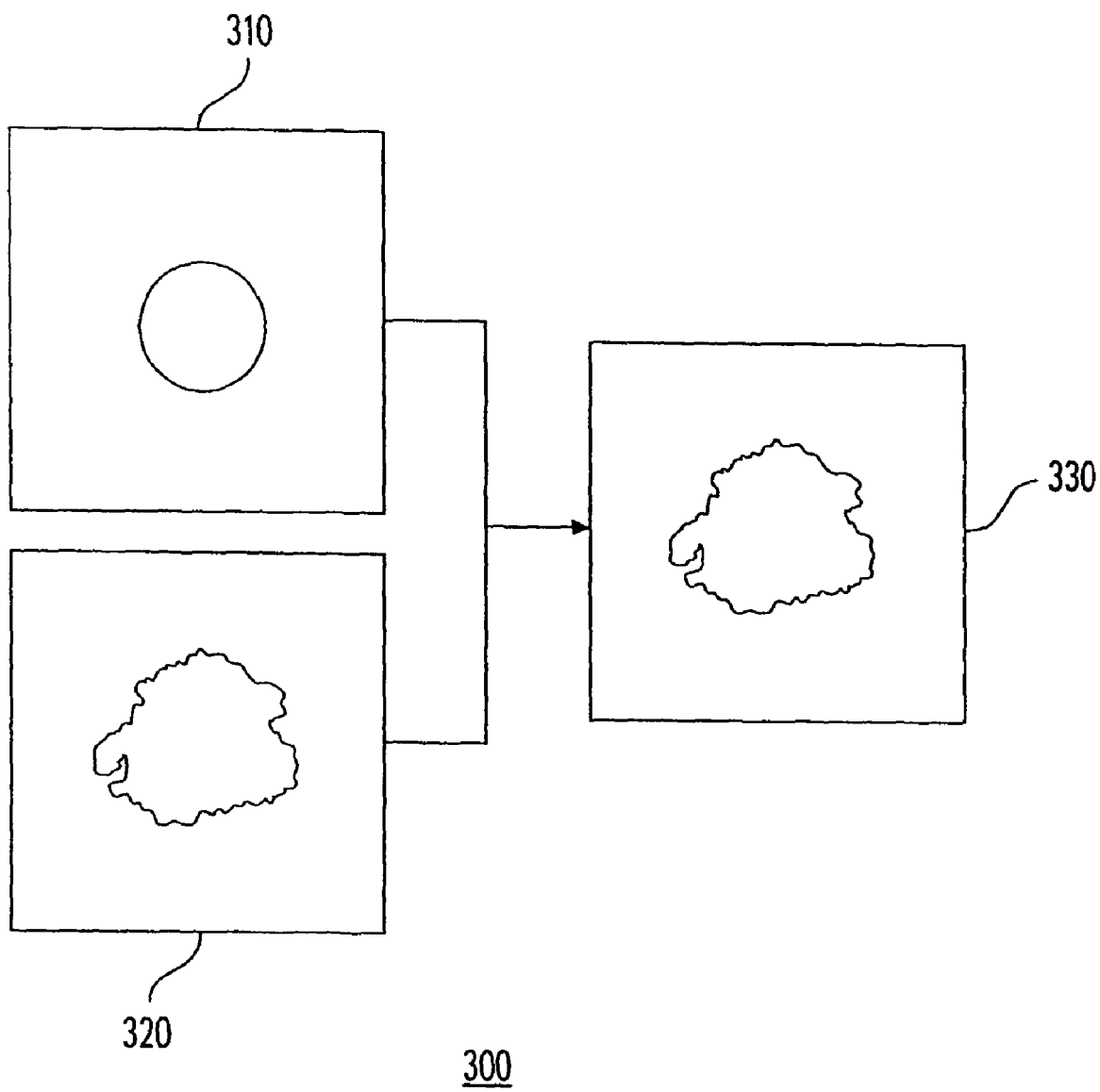
FIG. 3 illustrates components of a relevance map in accordance with one embodiment of the present invention.

As can be seen from FIG. 3, a relevance map may be computed as an additive superposition from the center map $I_C$, designated by reference 310, and the disparity map $I_{Disp}$, designated by reference 320. The output of the relevance map consists of an image mask $I_{Rel}$, designated by reference 330.

The recombination step uses information from a relevance map to determine which segments belong to the object. As opposed to the approach by E. Borenstein, E. Sharon, and S. Ullman (Combining top-down and bottom-up segmentation, cf. above), this recombination step does not use an explicit hypothesis about the object to be learned and only relies on information from the attentional system to define a region of interest, which can be refined by disparity information or other cues if available. To speed up processing, the probability of a segment belonging to the object, which is assumed to be in the region of interest, may be estimated by the overlap of the segment with the relevance map.

The relevance map also allows to specifically exclude segments be setting regions to zero relevance. This may be used to subtract regions representing skin and hand color that are detected in a separate specialized processing path. Always complete segments or connected components of segments are accepted and thus also pixels which fall outside the initial interest region can be included in the final mask.

Objects present in the input image but outside the interest region may not be segmented, which may save computation time. The architecture may be applied to all kinds of images in order to segment objects in the focus of attention defined by the relevance map, in particular it may be used in the context of online-learning of objects-in-hand presented by a human partner in front of an arbitrary background.

For this purpose, the number of pixels inPix of the intersection $I_{Rel}$ and $B_i$ (inPix=#($B_i \backslash I_{Rel}$)) and the number of pixels outPix, $B_i$ without $I_{Rel}$ (outPix=#($B_i \backslash I_{Rel}$)) are computed. These two parameters may be used for selecting the suitable masks. The probability of mask $B_i$ belonging to the object may be estimated by the relative frequency outPix/inPix. The mask may then be included in the final segment mask $I_{Final}$ if outPix/inPix<0.2.

An adaptive skin color segmentation may exclude skin color regions from the final mask. The final mask $I_{Final}$ may then be computed as the additive superposition of the selected $B_i$ and the skin color pixels are removed from this mask:

$$(I_{Final} = \Sigma_i B_i - I_{Skin}).$$

Figure 4:
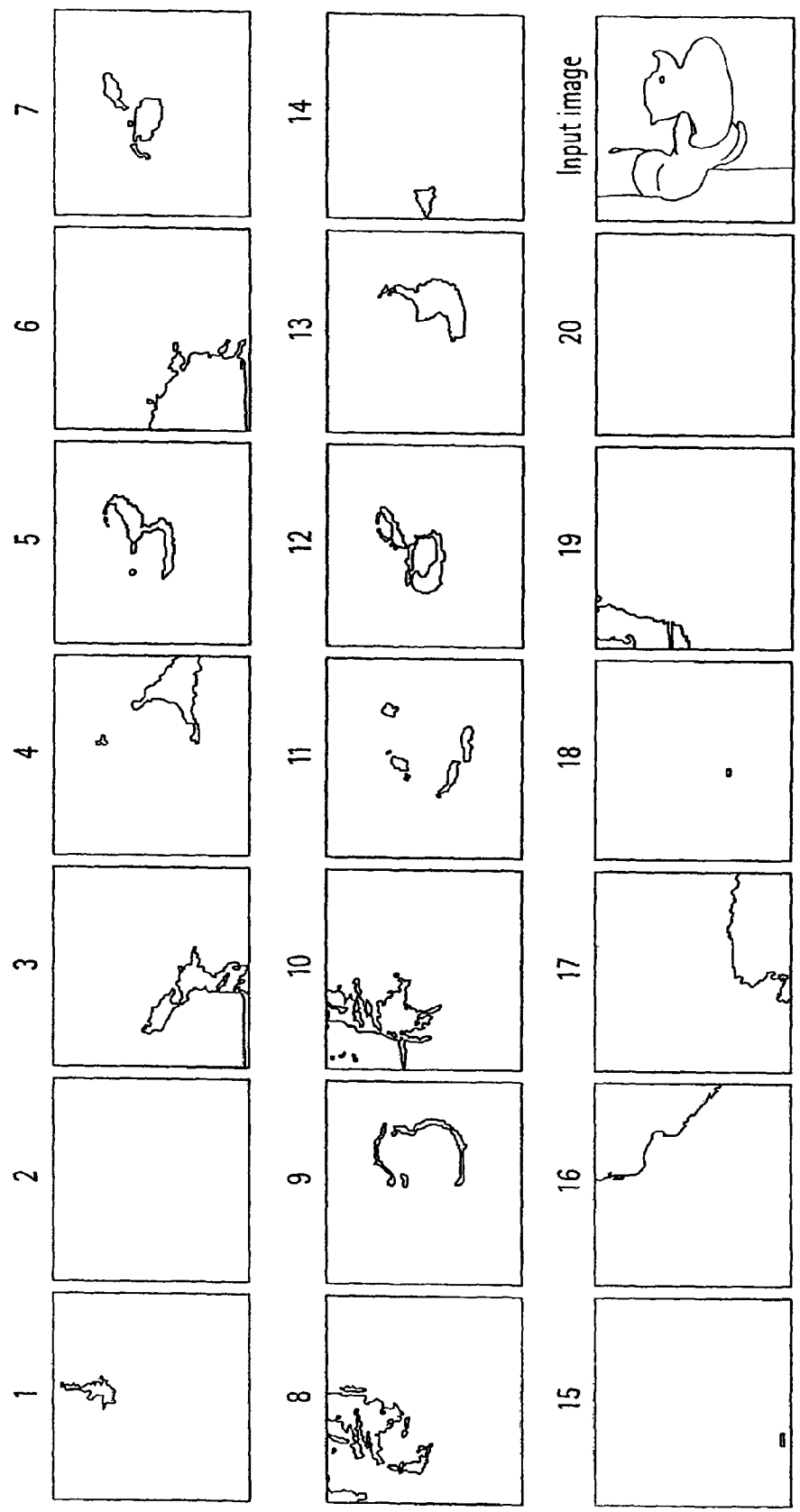
FIG. 4 is an illustration of a binarised ASDF segments $B_i$ in accordance with one embodiment of the present invention.

FIG. 4 shows binarised ASDF segments $B_i$. A combination of segments 5,7,9,11,12 and 13 constitutes the object mask for the shown object. Note that mask Nr. 9 gives parts of the contour and is not specialized to color features.

Figure 5:
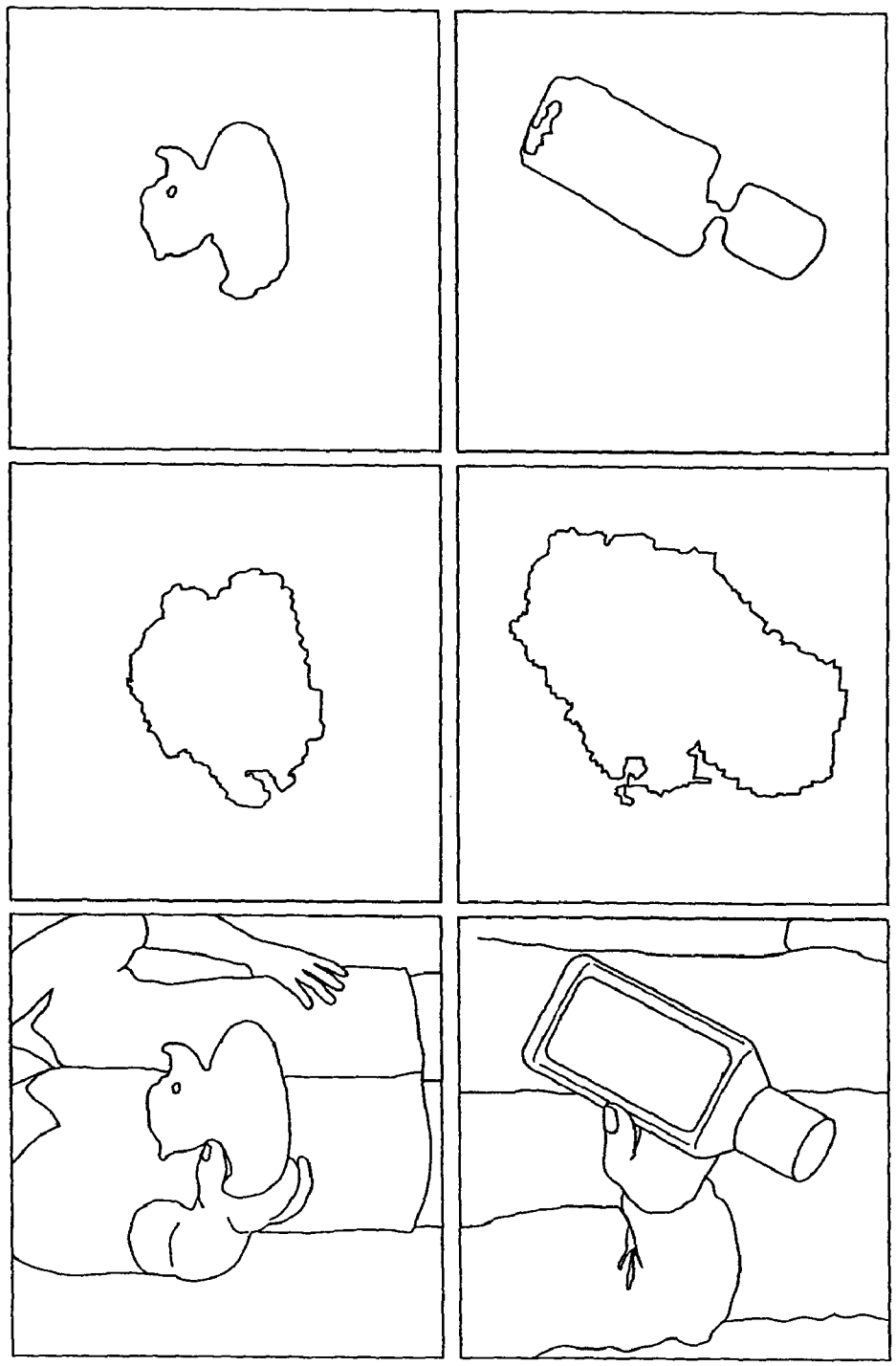
FIG. 5 is an illustration of segmentation results of the architecture (the input image, the disparity mask and the final segmentation) in accordance with one embodiment of the present invention.

FIG. 5 shows the segmentation results of the architecture (the input image, the disparity mask and the final segmentation).

What is claimed is:

1. A computer based method for determining an object segment of an object represented in an electronic image, comprising the steps of:
   forming a multitude of binary maps obtained from a multitude of basic filter maps via unsupervised learning of a multi-feature segmentation, the step of unsupervised learning of a multi-feature segmentation further comprising the steps of:
   forming training data vectors $\vec{m}_{(x,y)}$ using basic filter maps ($F_i$);
   obtaining codebook vectors $\vec{c}^j$ from the training data vectors $\vec{m}_{(x,y)}$ using a vector quantization network (VQ);
   generating adaptive topographic activation maps ($V^J$) from the training data vectors $\vec{m}_{(x,y)}$ and the codebook vectors $\vec{c}^j$, the adaptive topographic activation map ($V^J$) being scene dependent and computed as $V^j_{(x,y)} = \|\vec{m}_{(x,y)} - \vec{c}^j\|^2$;
   forming a relevance map that serves as a prediction mask for a region around the object and computed as a superposition from a center map and a disparity map;
   forming a selection of segments from the multitude of binary maps using the relevance map as a selection criterion; and
   forming an object map based on the selection.

2. The method according to claim 1, further comprising the step of:
   estimating a probability of a segment belonging to the object by the overlap of the segment and the relevance map in the electronic image.

3. The method according to claim 2, further comprising the step of forming a skin color mask or detecting skin color.

4. The method of claim 3, wherein an adaptive skin color segmentation further excludes skin color regions from a final mask.

5. The method of claim 1, wherein the step of generating adaptive topographic activation maps utilizes a standard vector quantization network VQ with a fixed number of training steps.

6. The method of claim 1, wherein the training data vectors $\vec{m}(x,y)$ include the pixel positions (x,y) as features.

7. The method of claim 1, wherein each component of the training data vectors $\vec{m}(x,y)$ are each normalized by their variance $\sigma(m_i)^2$.

8. The method of claim 1, wherein each component of the training data vectors is weighted by an additional weighting factor ($\xi^j$).

9. The method of claim 8, wherein the additional weighting factor ($\xi^j$) is heuristically determined.

10. The method of claim 1, wherein the codebook vectors $C^J$ are obtained by the steps of:
    drawing a random (x,y)-position from an image;
    generating the vector $\vec{m}(x,y)$ at this position;
    compute the minimal distance ($d_{min}$) of m(-x,y) to all codebook vectors $C^J$ in the current codebook; and
    assigning a new codebook vector ($\vec{c}^j$).

11. The method of claim 10, wherein the new codebook vector ($\vec{c}^j$) is equal to $\vec{m}_{(x,y)}$ if $d_{min}$ is larger than a threshold value (d') and a new $\vec{m}_{(x,y)}$ is drawn otherwise.

12. The method of claim 1, wherein the scene dependent adaptive topographic activation map ($V^J$) is binarised by the formula:

$$B^j_{(x,y)} = \begin{cases} 1 & \text{if } \|\vec{m}_{(x,y)} - \vec{c}^k\|^2 < \|\vec{m}_{(x,y)} - \vec{c}^j\|^2, \quad \forall k \neq j. \\ 0 & \text{else} \end{cases}$$

13. The method of claim 1, wherein the number of pixels (inPix) of the intersection between a relevance map based upon the relevance map and a binarised adaptive topographic activation map and the number of pixels (outPix) of the binarised adaptive topographic activation map without the relevance map ($I_{Rel}$) are used for selecting the suitable binary maps ($B_i$).

14. The method of claim 13, wherein a probability of a binary map ($B_i$) belonging to the object is estimated by the relative frequency outPix/inPix.

15. The method of claim 14, wherein a binary map ($B_i$) is included in an object map ($I_{final}$), if the relative frequency is larger than a given threshold.

16. The method of claim 15, wherein the object map ($I_{Final}$) is computed as the additive superposition of the selected binary map ($B_i$) and the skin color pixels are removed from the object map ($I_{Final} = \Sigma_i B_i - I_{Skin}$).

17. A computer software program product embodied on a non-transitory computer readable medium for determining an object segment of an object represented in an electronic image, the computer software program product comprising instructions, which, when executed, cause a processor to perform the steps of:
   forming a multitude of binary maps obtained from a multitude of basic filter maps via unsupervised learning of a multi-feature segmentation, the step of unsupervised learning of a multi-feature segmentation further comprising the steps of:
   forming training data vectors $\vec{m}_{(x,y)}$ using basic filter maps ($F_i$);
   obtaining codebook vectors $\vec{c}^j$ from the training data vectors $\vec{m}_{(x,y)}$ using a vector quantization network (VQ);
   generating adaptive topographic activation maps ($V^J$) from the training data vectors $\vec{m}_{(x,y)}$ and the codebook vectors $\vec{c}^j$, the adaptive topographic activation map ($V^J$) being scene dependent and computed as $V^j_{(x,y)} = \|\vec{m}_{(x,y)} - \vec{c}^j\|^2$;
   forming a relevance map that serves as a prediction mask for a region around the object and computed as a superposition from a center map and a disparity map;
   forming a selection of segments from the multitude of binary maps using the relevance map as a selection criterion; and
   forming an object map based on the selection.

* * * * *

UNITED STATES PATENT AND TRADEMARK OFFICE
CERTIFICATE OF CORRECTION

PATENT NO.        : 8,238,650 B2
APPLICATION NO.   : 11/610261
DATED             : August 7, 2012
INVENTOR(S)       : Michael Gotting, Heiko Wersing and Jochen J. Steil It is certified that error appears in the above-identified patent and that said Letters Patent is hereby corrected as shown below:

In the Claims

Column 10, line 1, Claim 10, delete "$m(-x,y)$," insert --$m(x,y)$--.

Signed and Sealed this
Ninth Day of September, 2014

Michelle K. Lee
*Deputy Director of the United States Patent and Trademark Office*